US012347263B2

(12) United States Patent
Dua et al.

(10) Patent No.: US 12,347,263 B2
(45) Date of Patent: Jul. 1, 2025

(54) SYSTEMS AND METHODS FOR DYNAMIC THEME SELECTION IN ELECTRONIC GAMING

(71) Applicant: Aristocrat Technologies, Inc., Las Vegas, NV (US)

(72) Inventors: Dinesh Dua, Alpharetta, GA (US); Daniel Marks, Decatur, GA (US); John Milliner, III, Alpharetta, GA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 334 days.

(21) Appl. No.: 17/957,838

(22) Filed: Sep. 30, 2022

(65) Prior Publication Data

US 2024/0112524 A1 Apr. 4, 2024

(51) Int. Cl.
*G07F 17/32* (2006.01)

(52) U.S. Cl.
CPC ...... *G07F 17/3213* (2013.01); *G07F 17/3209* (2013.01); *G07F 17/3267* (2013.01)

(58) Field of Classification Search
None
See application file for complete search history.

(56) References Cited

U.S. PATENT DOCUMENTS

| | | | |
|---|---|---|---|
| 6,731,313 | B1 | 5/2004 | Kaminkow |
| 7,040,987 | B2 | 5/2006 | Walker |
| 7,169,052 | B2 | 1/2007 | Beaulieu |
| 7,392,470 | B2 | 6/2008 | Kammler |
| 7,699,699 | B2 | 4/2010 | Gilliland |
| 7,774,831 | B2 | 8/2010 | Kuznetsov |
| 7,837,556 | B2 | 11/2010 | Breckner |
| 8,038,524 | B2 | 10/2011 | Bryant |
| 8,137,192 | B2 | 3/2012 | Thomas |
| 8,187,073 | B2 | 5/2012 | Beaulieu |
| 8,221,215 | B2 | 7/2012 | Walker |
| 8,235,820 | B2 | 8/2012 | Fine |
| 8,313,382 | B2 | 11/2012 | Ward |
| 8,360,841 | B2 | 1/2013 | Walker |
| 8,506,399 | B2 | 8/2013 | Pryzby |
| 8,535,142 | B2 | 9/2013 | Aoki |
| 8,545,326 | B2 | 10/2013 | Underdahl |
| 8,550,910 | B2 | 10/2013 | Ward |
| 8,602,885 | B2 | 12/2013 | Arezina |
| 8,632,400 | B2 | 1/2014 | Acres |

(Continued)

*Primary Examiner* — Seng H Lim
(74) *Attorney, Agent, or Firm* — Armstrong Teasdale LLP

(57) ABSTRACT

An electronic gaming system including a memory with instructions stored thereon and a processor in communication with the memory is described. The instructions, when executed by the processor, cause the processor to cause display of an electronic game with a first theme, receive an input associated with a second theme, and transmit an identifier associated with the second theme to a host component. The instructions also cause the processor to receive content associated with the second theme and cause display of the electronic game with the second theme. The instructions further cause the processor to cause a game outcome for the electronic game to be stored in a game log wherein upon generation of a replay of the game outcome the replay includes the at least one symbol, and cause display of the game outcome.

20 Claims, 19 Drawing Sheets

(56) References Cited

U.S. PATENT DOCUMENTS

| | | | | |
|---|---|---|---|---|
| 8,662,998 | B2 | 3/2014 | Schueller | |
| 8,663,005 | B2 | 3/2014 | Anderson | |
| 8,690,662 | B2 | 4/2014 | Walker | |
| 8,696,425 | B2 | 4/2014 | Fine | |
| 8,702,508 | B2 | 4/2014 | Gura | |
| 8,814,649 | B2 | 8/2014 | Walker | |
| 8,814,676 | B2 | 8/2014 | De Courssou | |
| 9,033,785 | B2 | 5/2015 | Walker | |
| 9,064,368 | B2 | 6/2015 | Englman | |
| 9,189,917 | B2 | 11/2015 | Anderson | |
| 9,196,113 | B2 | 11/2015 | Robbins | |
| 9,214,062 | B2 | 12/2015 | Pryzby | |
| 9,336,652 | B2 | 5/2016 | Arezina | |
| 9,384,628 | B2 | 7/2016 | Bryson | |
| 9,474,972 | B2 | 10/2016 | Lenger | |
| 10,134,228 | B2 | 11/2018 | McIntyre | |
| 10,417,872 | B2 | 9/2019 | Heathcote | |
| 10,438,449 | B2 | 10/2019 | Triplett | |
| 11,076,037 | B2 | 7/2021 | Yu | |
| 11,928,931 | B2 * | 3/2024 | Coppola | G07F 17/3223 |
| 2006/0063575 | A1 * | 3/2006 | Gatto | A63F 13/32 463/1 |
| 2008/0194315 | A1 * | 8/2008 | Seelig | G07F 17/32 463/20 |
| 2019/0102995 | A1 * | 4/2019 | Meyer | G07F 17/34 |
| 2020/0151997 | A1 | 5/2020 | Danielson | |
| 2021/0027580 | A1 * | 1/2021 | Coppola | G07F 17/3218 |
| 2021/0312756 | A1 * | 10/2021 | Penacho | G07F 17/3262 |
| 2021/0383641 | A1 * | 12/2021 | Meyer | A63F 13/79 |

* cited by examiner

SYSTEMS AND METHODS FOR DYNAMIC THEME SELECTION IN ELECTRONIC GAMING

TECHNICAL FIELD

The field of disclosure relates generally to electronic gaming, and more specifically, to systems and methods for dynamic theme selection in electronic gaming.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming system is described. The electronic gaming system includes at least one memory with instructions stored thereon and at least one processor in communication with the at least one memory. The instructions, when executed by the at least one processor, cause the at least one processor to cause display of an electronic game with a first theme, the first theme including a first plurality of symbols, receive an input associated with a second theme, and transmit an identifier associated with the second theme to a host component of the at least one processor. The instructions also cause the at least one processor to receive content associated with the second theme from the host component wherein the content includes a second plurality of symbols and cause display of the electronic game with the second theme, the second theme including the second plurality of symbols. The instructions further cause the at least one processor to cause a game outcome for the electronic game to be stored in a game log in the at least one memory as being associated with the identifier wherein the game outcome includes at least one symbol of the second plurality of symbols, and wherein upon generation of a replay of the game outcome, the replay includes the at least one symbol based on the identifier and the game outcome and cause display of the game outcome.

In another aspect, at least one non-transitory, computer-readable storage medium with instructions stored thereon is described. The instructions, when executed by at least one processor, cause the at least one processor to cause display of an electronic game with a first theme, the first theme including a first plurality of symbols, receive an input associated with a second theme, and transmit an identifier associated with the second theme to a host component of the at least one processor. The instructions also cause the at least one processor to receive content associated with the second theme from the host component, wherein the content includes a second plurality of symbols, and cause display of the electronic game with the second theme, the second theme including the second plurality of symbols. The instructions further cause the at least one processor to cause a game outcome for the electronic game to be stored in a game log in at least one memory as being associated with the identifier wherein the game outcome includes at least one symbol of the second plurality of symbols, and wherein upon generation of a replay of the game outcome, the replay includes the at least one symbol based on the identifier and the game outcome and cause display of the game outcome.

In yet another aspect, an electronic gaming system is described. The electronic gaming system includes at least one memory with instructions stored thereon and at least one processor in communication with the at least one memory. The instructions, when executed by the at least one processor, cause the at least one processor to store a plurality of themes in the at least one memory, receive an input associated with a theme of the plurality of themes, and transmit an identifier associated with the theme to a host component of the at least one processor. The instructions also cause the at least one processor to receive content associated with the theme from the host component, wherein the content includes a plurality of symbols and cause display of an electronic game with the theme, the theme including the plurality of symbols. The instructions further cause the at least one processor to cause a game outcome for the electronic game to be stored in a game log in the at least one memory as being associated with the identifier wherein the game outcome includes at least one symbol of the plurality of symbols, and wherein upon generation of a replay of the game outcome, the replay includes the at least one symbol based on the identifier and the game outcome, and cause display of the game outcome.

DETAILED DESCRIPTION

Figure 1:
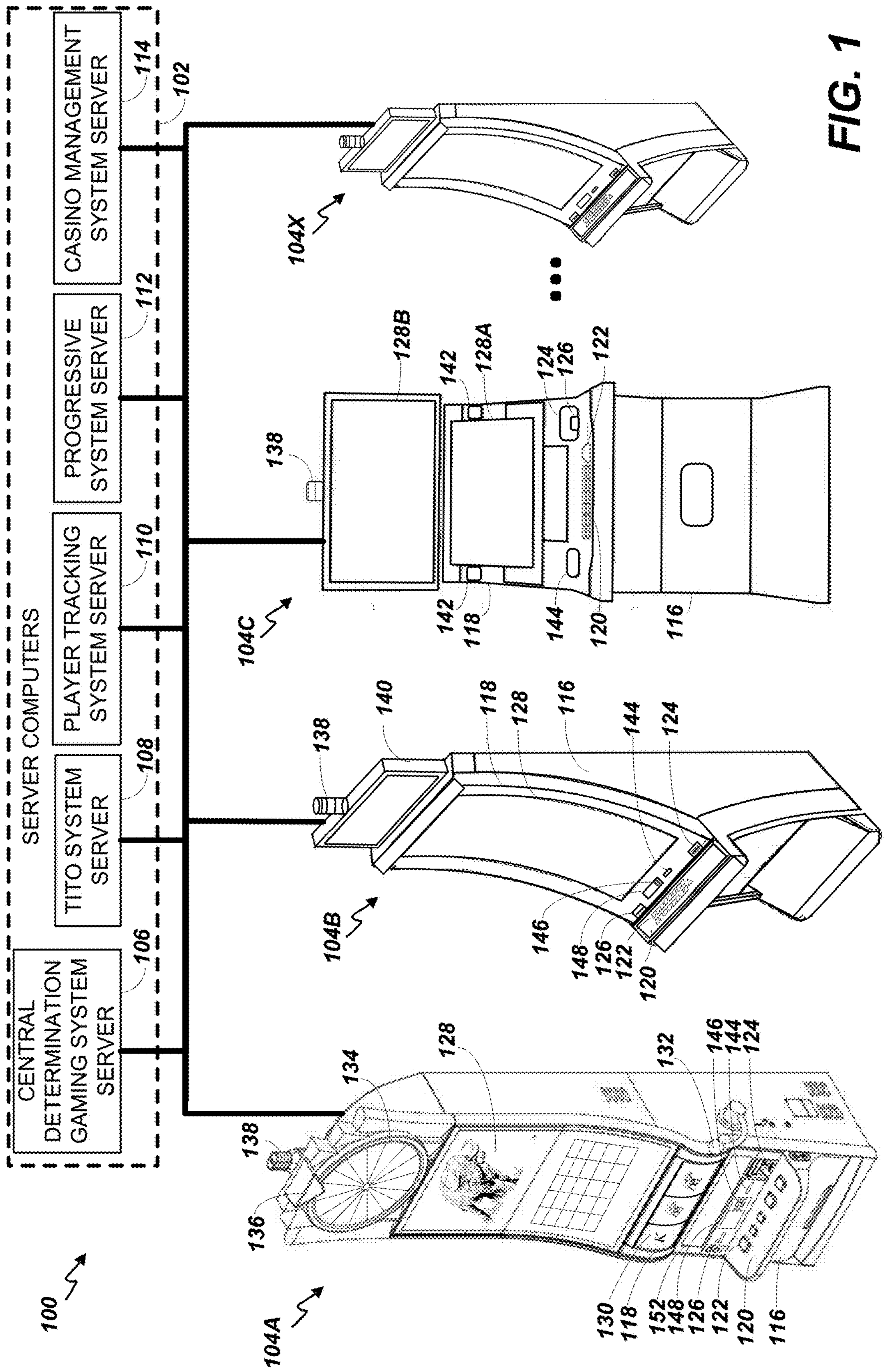
FIG. 1 is an exemplary diagram showing several EGMs networked with various gaming related servers.

The systems and methods described herein include a gaming system that enables a user (e.g., player or operator) to dynamically select a theme for a gaming instance played on an electronic gaming device. By selecting the theme, the output of the game (e.g., the symbols displayed during game play) is dynamically altered. In the example embodiment, a selection page (e.g., or plurality of scrollable selection pages with previous, exit and next buttons) including a plurality of themes is displayed at an electronic gaming device. Upon receiving selection of a theme, the device requests a host reload a game with the selected theme (e.g., by transmitting a theme identifier (ID) associated with the selected theme to the host). In some embodiments, more than one theme may be selected (e.g., more than one theme may be implemented at a time). The host then starts a game reset cycle, recreates the game with the selected theme, and loads the game with the selected theme onto the gaming device (e.g., the game client is created again, is initialized to load the game with the selected theme).

In the example embodiment, a selected theme may be associated with symbols, animations, videos, background animations, voice overs, reel backgrounds, and/or help screens. In other words, upon selection of a theme, any of the above characteristics, or other characteristics, may be changed to be specific to the selected theme.

In some embodiments, an idle and/or default state may be configured for the game. For example, a game provider could set a default theme for the game such that before receiving a selection, the game is provided with a default theme (e.g., or the device is configured in an "attract" mode to attract players with the default theme). In some embodiments, the default theme may change dynamically (e.g., based on a schedule stored in memory). In some embodiments, the default theme may include more than one theme. In some embodiments, the default theme may be a randomly determined theme. In some embodiments, upon a game end event (e.g., a cashout event at the gaming device), the device may automatically revert to the default theme (e.g., as opposed to a theme selected for play of the game by a player).

When the game is loaded with a selected theme, the theme ID is stored and persists in a game log (e.g., that records game events, such as game outcomes, for example). The theme ID being stored in the game log supports replay (e.g., of game outcomes) and recovery (e.g., of a most recently stored theme, as explained above). Upon a recovery event, the device loads and switches to a theme associated with the most recently stored theme ID in the game log. If a theme is selected and no game is played with the selected theme, the theme ID may not be stored in the game log.

In the example embodiment, an electronic device causes display of an electronic game with a first theme including a plurality of symbols (e.g., a default theme). An input associated with a second theme is received. For example, the gaming device may cause display of a menu including a plurality of selectable icons associated with a plurality of themes and receive the input associated with the second theme at the menu. In some embodiments, themes may be selected in a number of ways different from selection at a menu including automatic selection of a theme stored in a player account based upon detection of a player associated with the player account at the gaming device (e.g., based on a card-in event and/or communication with a player device associated with the player account). In other words, the gaming device may automatically determine a player selected theme based on data associated with a player account transmitted from another device, such as a player tracking server or a player device (e.g., mobile device). Thus, the player may select a theme for storage in their player account such that upon their arrival at a gaming device, the gaming device automatically updates to correspond to the theme stored in the player account.

Based on selection of a theme, an identifier associated with the theme (e.g., a theme ID) is transmitted to a host computing component associated with the electronic game. Content associated with the second theme, including a second plurality of symbols (e.g., and/or at least one of an animation, a video, a background animation, a voice over, a reel background, or a help screen) is then received from the host.

Upon receipt of the content, the electronic game is displayed with the second theme including the second plurality of symbols. A game outcome, including at least one symbol of the second plurality of symbols, for the electronic game is generated, displayed, and stored in a game log as being associated with the identifier. Accordingly, upon replay and/or recovery of the game outcome, the replay and/or recovery includes the game outcome including the at least one symbol based on the identifier.

When a game session at the gaming device ends, the gaming device reverts back to displaying the default theme (e.g., until a player selects a different theme or the default theme is updated).

Any of the themes described herein may include a plurality of themes. Further, themes stored in memory may be updated over time (e.g., manually and/or automatically), as explained elsewhere herein.

Certain technical problems arise when implementing dynamic theme selection, as described herein. For example, game outcomes in certain gaming environments are required to be stored for, as examples, auditing purposes (e.g., audits of gameplay), replaying purposes (e.g., for a player and/or operator to replay game outcomes), and/or restoring purposes (e.g., to restore play of a game on a gaming device). Accordingly, the symbols being shown during the game need to be stored as they were shown as part of the game outcome. More variables are introduced by the ability for player selection and/or set of a default theme as described herein, and the selected theme for a game outcome needs to be loaded efficiently and stored appropriately for accurate re-creation and/or analysis of the game outcome.

Accordingly, technical solutions to at least the technical problems described herein are provided. For example, to maintain integrity of stored game outcomes, a theme ID is stored with each respective game outcome such that, upon recreation of the game outcome, the symbols displayed in the recreation match those that were shown when the game outcome was initially displayed. In other words, the game outcome is stored along with the theme ID such that, in some examples, placeholders in the game outcome are filled in with appropriate symbols that match the theme ID. Further, content associated theme may be loaded to a game client in a specific order in order to most efficiently load the content.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
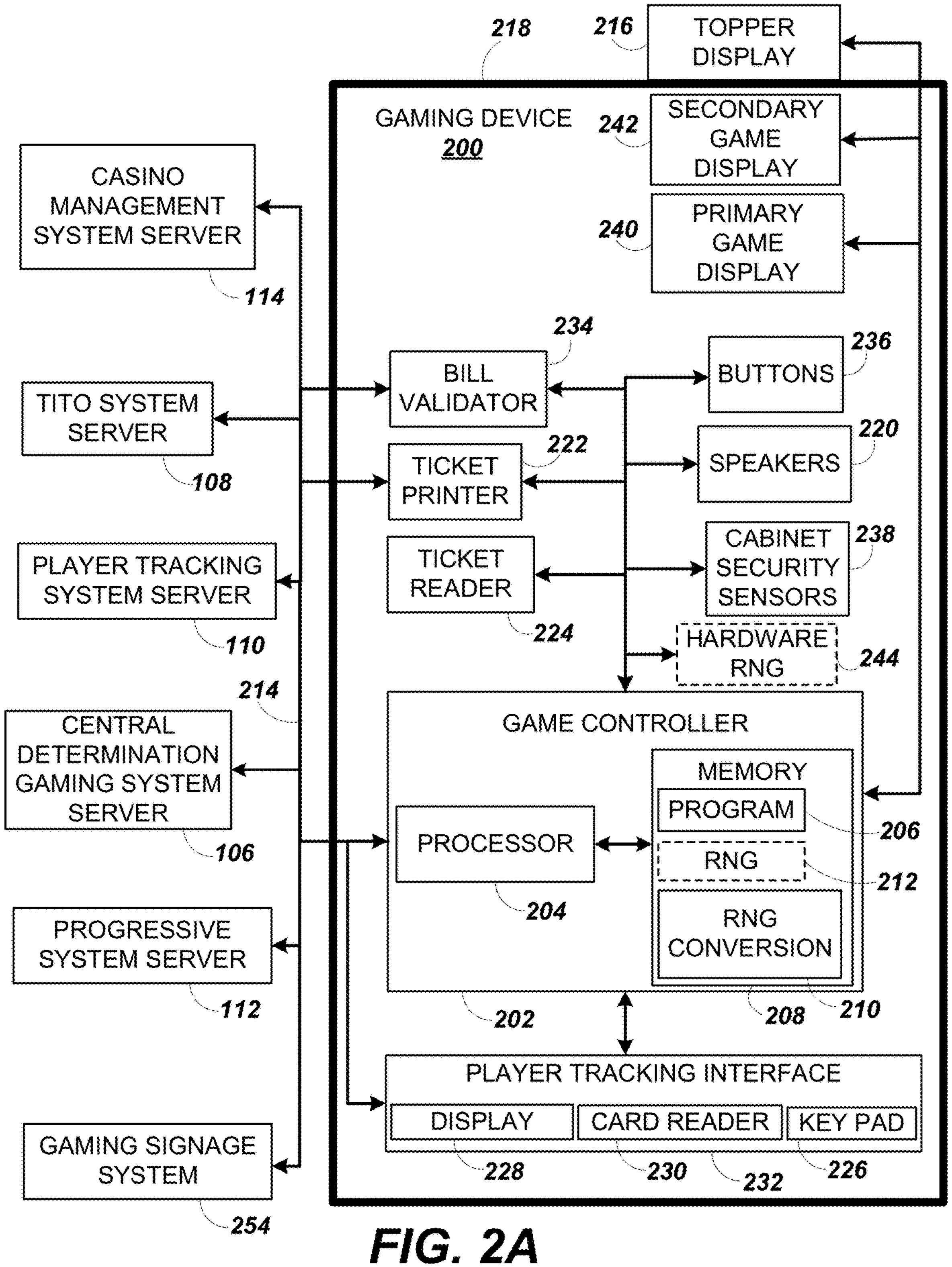
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208.

In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
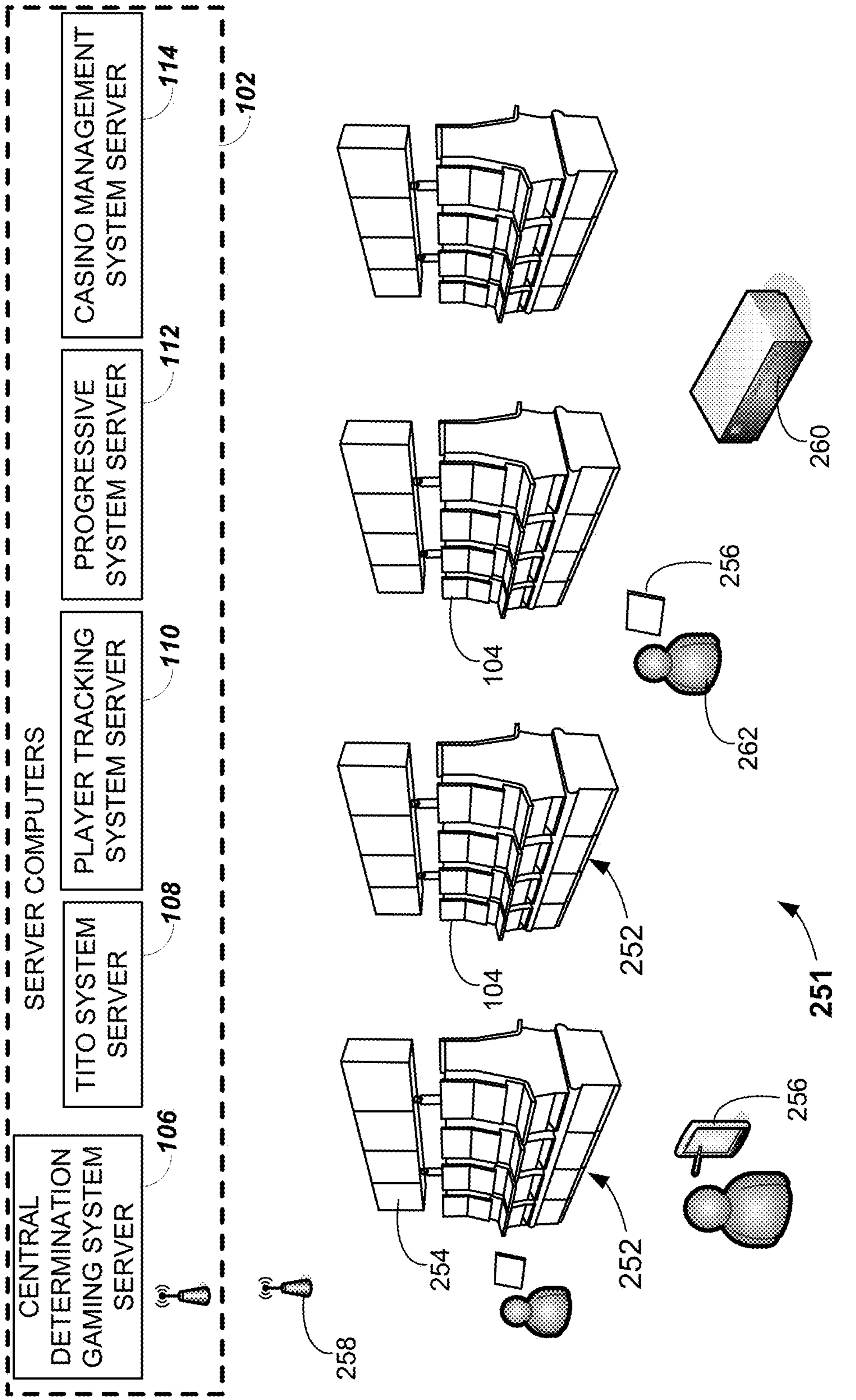
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
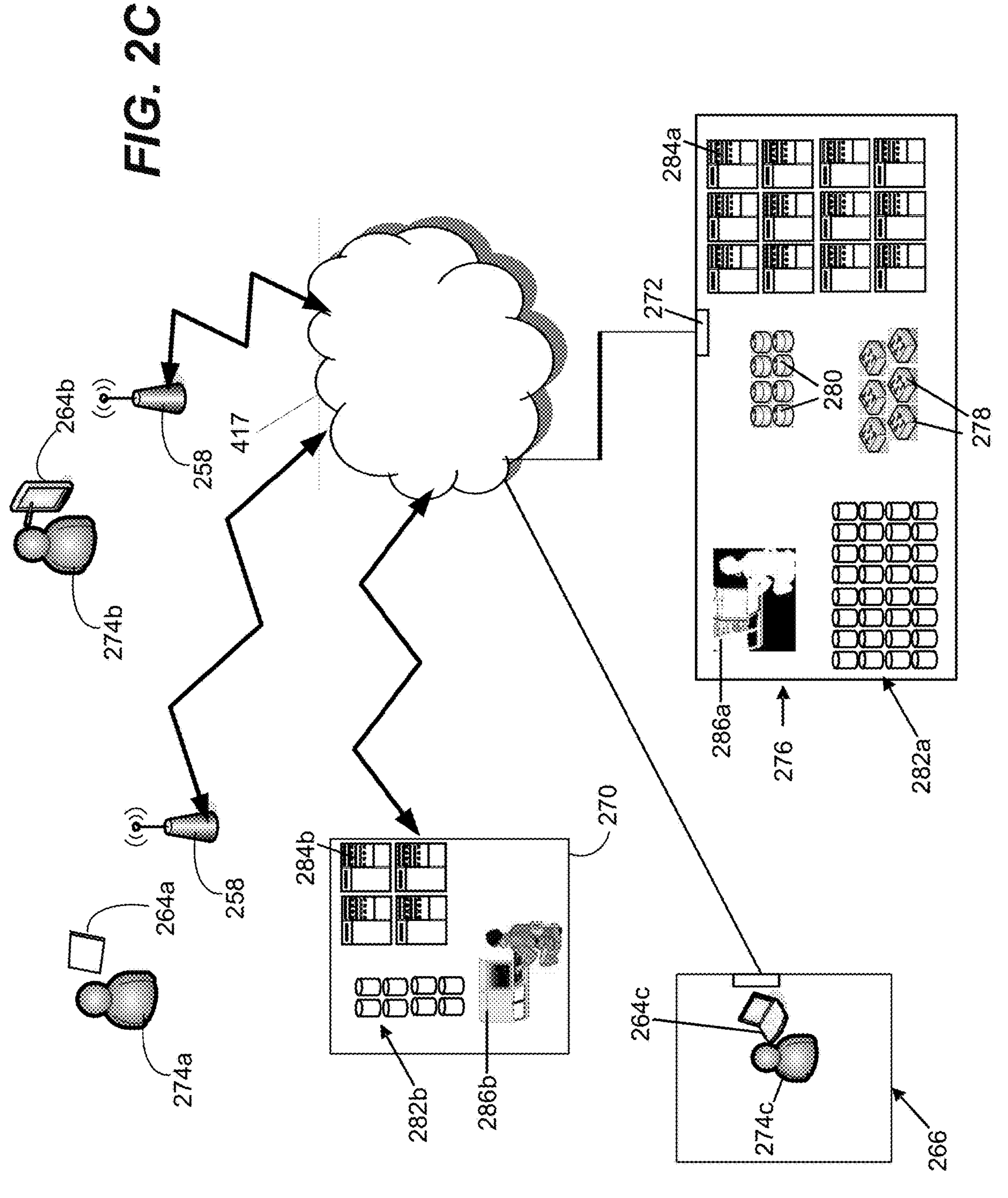
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
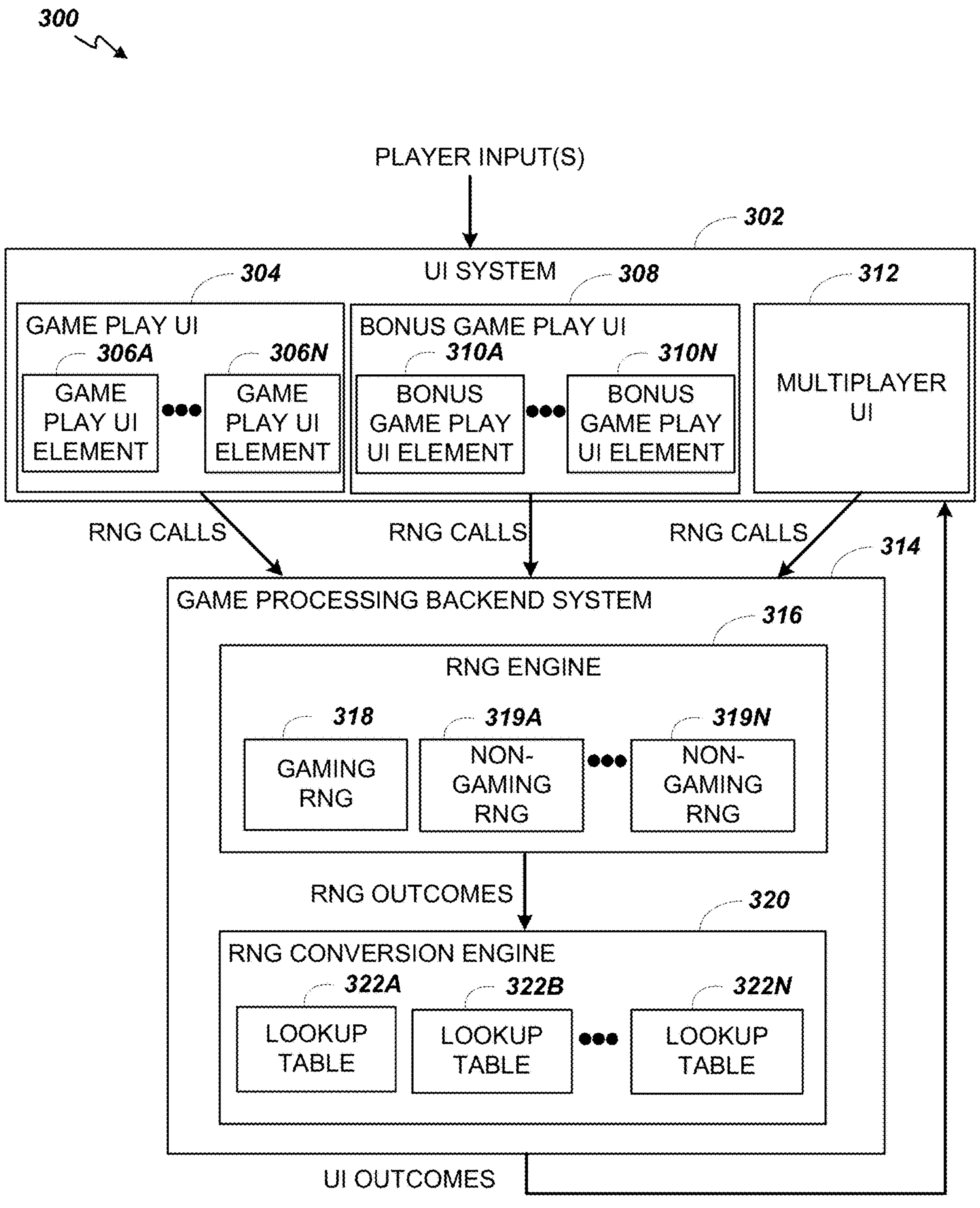
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
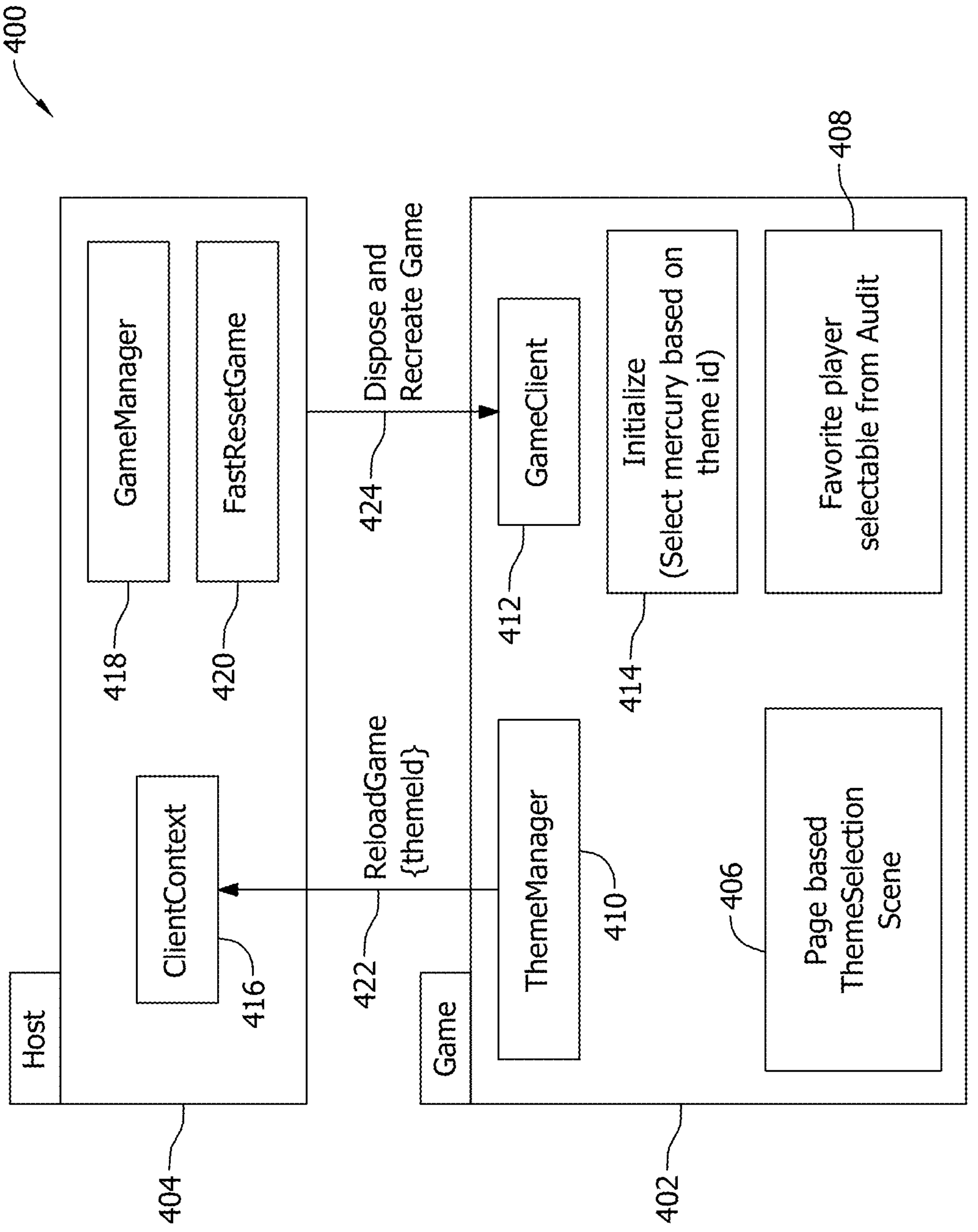
FIG. 4 illustrates an example system diagram for dynamic theme selection in electronic gaming, in accordance with the present disclosure and for utilization with any of the diagrams, environments, and or architectures shown in FIGS. 1-3.

FIG. 4 illustrates an example computer system 400 diagram for dynamic theme selection in electronic gaming. For example, system 400 and the additional and/or alternative examples shown in FIGS. 5A-11 may be implemented by any of the gaming devices (e.g., 104A-X, 200, 256, 264*a-c*), systems, and/or architectures described herein. In the example shown in FIG. 4, system 400 includes a game component 402 and a host component 404. Game component 402 includes a theme selection component 406, a player favorite component 408, a theme manager component 410, and a game client component 412 including a game initialization component 414. Host component 404 includes a client context component 416, and a game manager component 418 including a fast game reset component 420.

In the example embodiment, a theme selection page (e.g., or plurality of scrollable selection pages with previous, exit and next buttons) including a plurality of themes is caused to be displayed at an electronic gaming device by theme selection component 406. Upon receiving selection of a theme, theme manager component 410 requests host component 404 reload a game with the selected theme. For example, theme manager component 410 transmits a request 422 including a theme ID associated with the selected theme to client context component 416.

In some embodiments, themes may be selected in a number of ways different from selection at a menu, including automatic selection of a theme stored in a player account based upon detection of a player associated with the player account at the gaming device (e.g., based on a card-in event and/or communication with a player device associated with the player account). In other words, player favorite component 408 may automatically determine a player selected theme based on data associated with a player account transmitted from another device, such as player tracking server 110 or a player device (e.g., EUDs 264*a-c*), and theme manager component 410 may transmit request 422 based on a theme ID associated with the player selected theme as determined by player favorite component 408. Thus, the player may select a theme for storage in their player account such that upon their arrival at a gaming device, the gaming device automatically updates to correspond to the theme stored in the player account.

Based on request 422, client context component 416 communicates with game manager component 418 to coordinate a game reset (e.g., from the default theme to the selected theme). Fast game reset component 420 recreates the game with the selected theme and transmits a message 424 to game client component 412 including the recreated game.

Based on receipt of the recreated game, game initialization component 414 initializes the recreated game on the gaming device and game client component 412 executes the game with the selected theme.

Figure 5A:
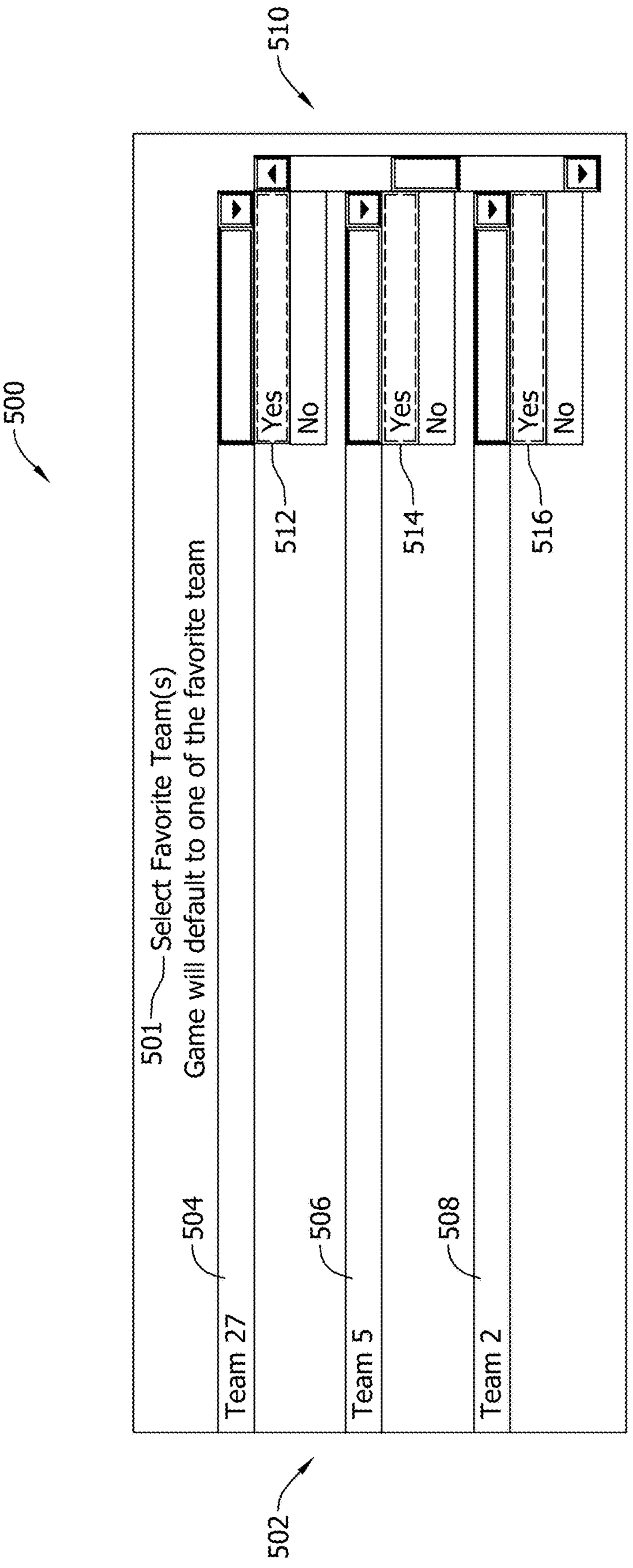
FIG. 5A illustrates an example screenshot and/or operator selection interface for dynamic theme selection in electronic gaming, continuing the example shown in FIG. 4.

FIG. 5A illustrates an example operator selection interface 500 or screenshot showing an output after for dynamic theme selection in electronic gaming. As shown in FIG. 5A, interface 500 includes instructions 501, a plurality of themes 502, including theme 504, theme 506, and theme 508, and a plurality of theme controls 510, including control 512, control 514, and control 516, each control 512-516 corresponding to one of themes 504-508.

Instructions 501 indicate to an operator which selections are available on interface 500. For example, as shown in FIG. 5A, instructions include "Select Favorite Team(s)" and "Game will default to one of the favorite team." Accordingly, the operator, in this particular example, can select any number of favorite football teams (e.g., or conferences, divisions, players, coaches, player position groups, etc.), as the example embodiment described herein corresponds to professional football. Notably, it should be appreciated that additional/alternative themes are envisioned and the themes described herein are not limited to football teams, or other sports themes for that matter, and may include any theme (e.g., holidays, movies, musical groups, etc.).

In the example of FIG. 5A, three themes 504-508 corresponding to three teams are shown, but all of the teams may be selectable in different areas (not shown) of interface 500. In the example embodiment, a default selection at controls 512-516 is "No" (e.g., not a selected default). If no theme is selected, at least one theme from the list of themes may be randomly selected. If one theme is selected, that theme is set as the default theme for the game. If more than one theme is selected, the selected themes may rotate and/or alternate. For example, if more than one theme is selected the default themes may rotate at predetermined times (e.g., after a number of plays of a game, a predetermined amount of time, etc.). In some embodiments, default themes may be automatically updated based events, such as events on a calendar. In various embodiments, the list of plurality of themes 502 is dynamically generated and displayed based on certain metadata that is stored in the memory of the gaming device.

For example, continuing the football theme described herein, a default theme may correspond to an football team in a geographical location in/near a gaming establishment (e.g., in Las Vegas, the Las Vegas (LV) football team may be the default theme). Further, one or more themes may be updated based on the football schedule. For instance, continuing the Las Vegas example above, if the LV football team has an upcoming game against a certain team, that opposing team may be selected as a default team (e.g., in addition to or alternatively from the LV football team). For example, say the Denver football team have an upcoming game against the LV football team in Las Vegas. Accordingly, the default theme may be updated to include both the LV football team and the Denver football team at gaming establishments in Las Vegas (e.g., because fans of the Denver football team may be travelling to Las Vegas for the game and would be better entertained by a default theme including their favorite team). Of course, regardless of the selection of default themes (e.g., by an operator), a player would have the option to change the theme, as described herein in further detail. Accordingly, certain technical benefits are provided herein including dynamic determination of a default theme based upon location and/or time (e.g., a schedule), as examples.

In another football example, certain themes may be selected to correspond to certain football-related calendar events. For example, during primetime games (e.g., Sunday night football, Monday night football), themes according to those games (e.g., a theme for the primetime game, themes for teams in the game, etc.). In some embodiments, game themes may correspond to other events on a calendar such as holidays (e.g., Halloween in October, Thanksgiving in November, etc.).

Theme selections, as shown in FIG. 5A, can be made at any time by an operator and do not require an entire clear of memory of a game. For example, change of a default theme by an operator may not effect a game currently being played (e.g., the default theme change may take place, if a gaming device is in use, after a current gaming session at the gaming device ends). Then, upon a player beginning a new gaming session, a theme selection screen (e.g., see FIG. 7A) may be presented to allow the player to select a different theme, if they so desire.

Figure 5B:
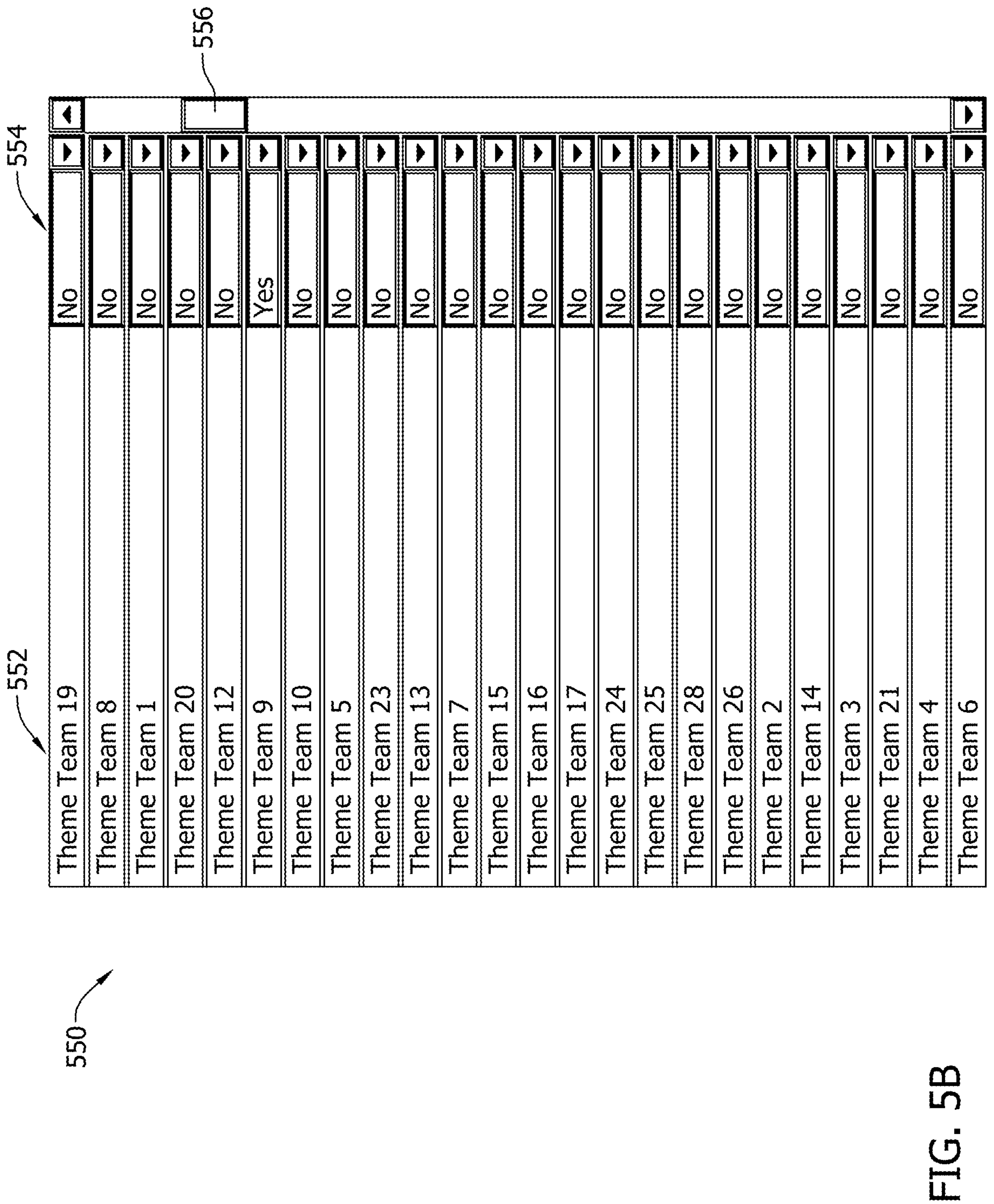
FIG. 5B illustrates another example screenshot and/or operator selection interface for dynamic theme selection in electronic gaming, in accordance with the present disclosure.

FIG. 5B illustrates another example screenshot and/or operator selection interface 550 for dynamic theme selection in electronic gaming. For example, similar to plurality of themes 502, interface 550 includes a plurality of themes 552 (e.g., in this example, corresponding to a plurality of football teams). Further, similar to plurality of controls 510, interface 550 includes a plurality of selectable controls 554 and a selector 556 operable to be selected to allow for scrolling of plurality of themes 552.

Figure 6:
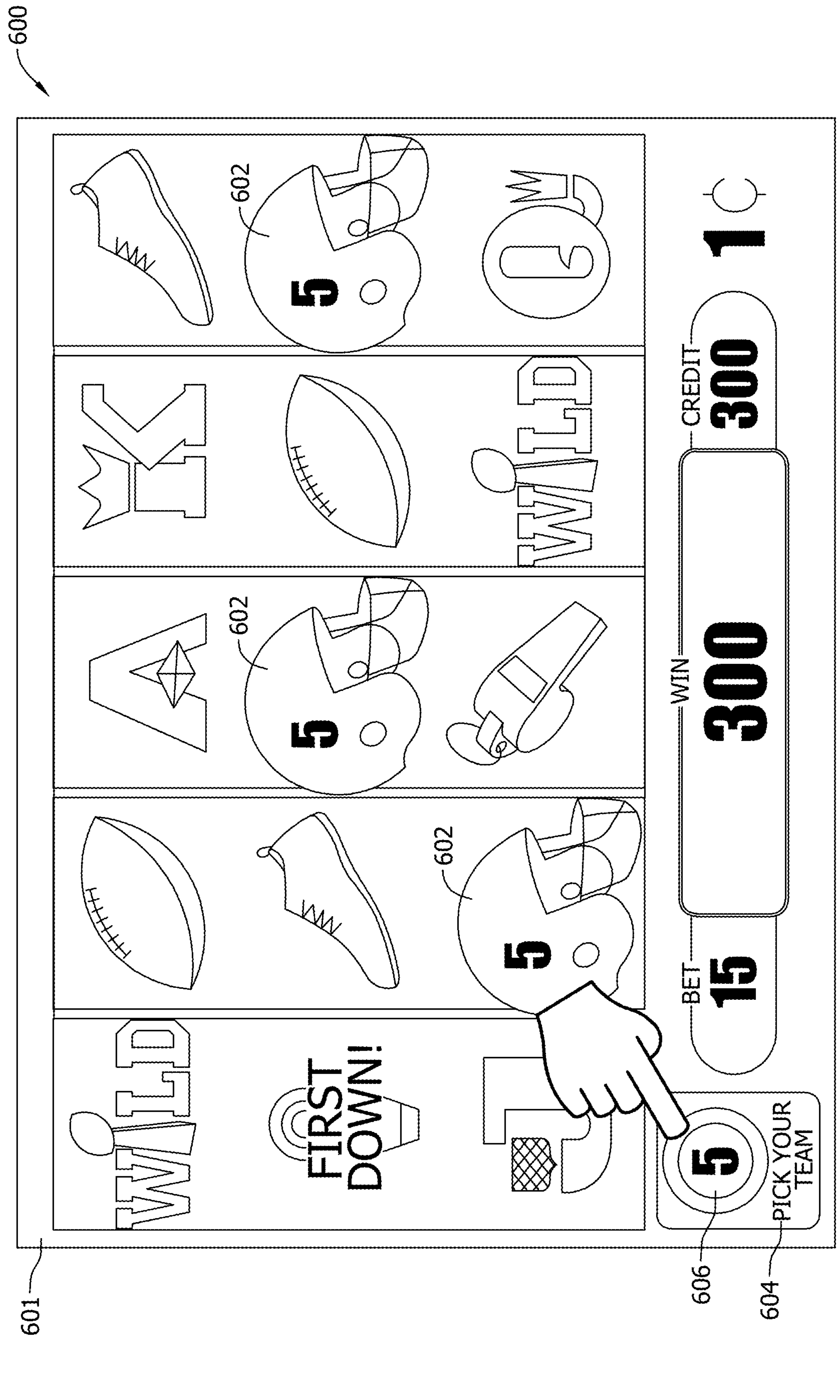
FIG. 6 illustrates an example screenshot and/or user interface showing an output after for dynamic theme selection in electronic gaming, in accordance with the present disclosure.

FIG. 6 illustrates an example interface 600 or screenshot showing an output after for dynamic theme selection in electronic gaming, in accordance with the present disclosure. As shown in FIG. 6, interface 600 includes a theme background 601, theme symbols 602, a theme selector 604 including a theme indicator 606.

Continuing the football example described herein, background 601 includes a football field. Theme symbols 602 are displayed according to a default theme, here being a Dallas football team (e.g., an professional football team, or "Team 5"). Although symbols 602 are shown in FIG. 6 as being the same theme symbol (e.g., a football helmet), it should be appreciated that theme symbols 602 could be any symbols associated with the theme (e.g., football players, coaches, jerseys, etc.).

Interface 600 could support play of an electronic game including the selected theme if a player desires to play with the default theme (e.g., spins of the shown reels with at least some symbols associated with the default theme). Additionally/alternatively, a player could select theme selector 604 to select a different theme (e.g., see FIG. 7A). As shown in FIG. 6, theme selector 604 includes a theme indicator 606 indicating a currently-selected theme.

Figure 7A:
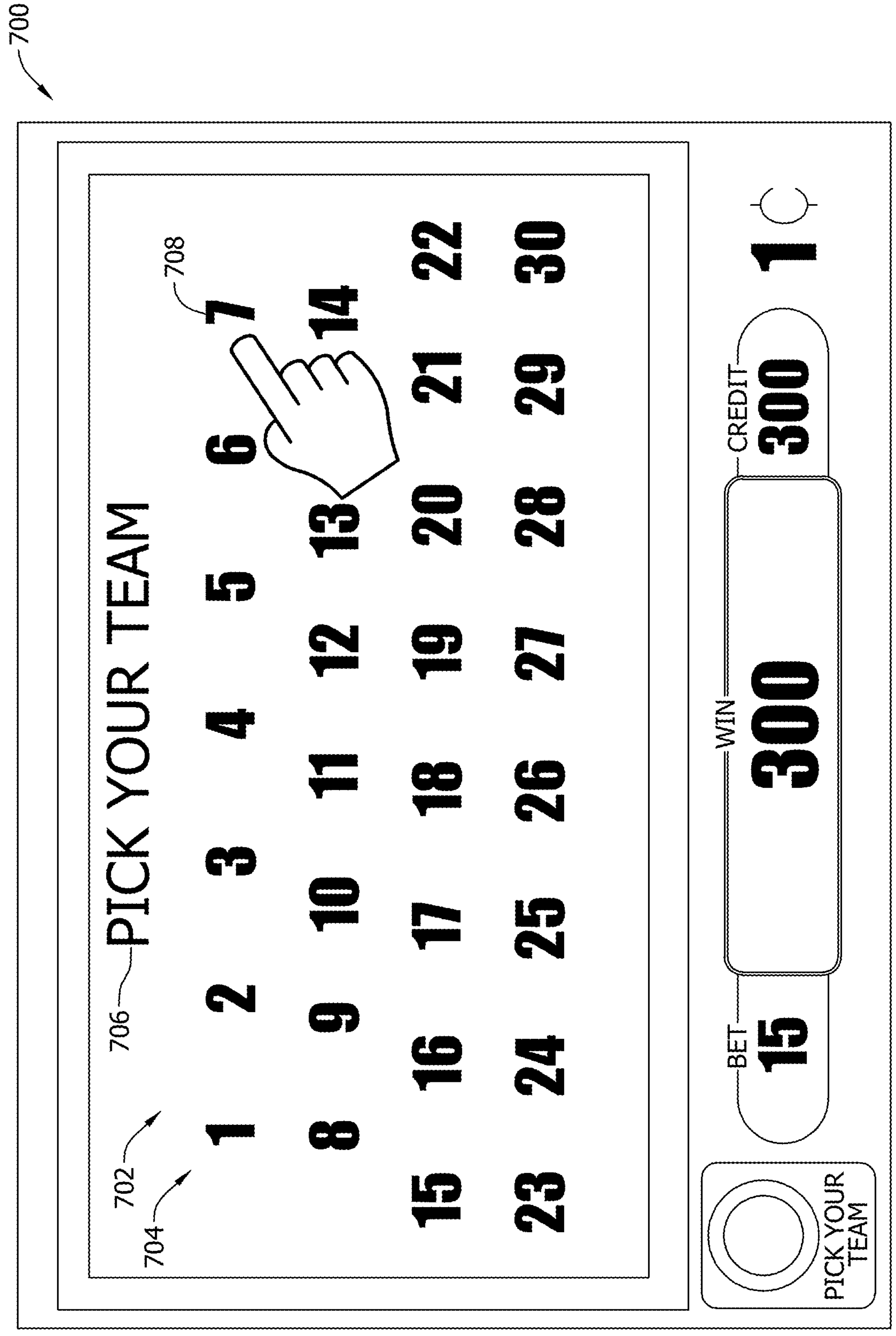
FIG. 7A illustrates an example selection screenshot and/or interface for dynamic theme selection in electronic gaming, continuing the example shown in FIG. 6.

FIG. 7A illustrates an example selection interface 700 or screenshot showing an output after for dynamic theme selection in electronic gaming, continuing the example shown in FIG. 6 (e.g., displayed upon selection of theme selector 604). Interface 700 includes a list 702 of available themes (e.g., overlaid upon interface 600). Continuing the football theme described herein, list 702 includes a plurality of selectors 704 each corresponding to an available theme. Instructions 706 indicate that a player should "Pick Your Team," if so desired. Accordingly, a selection of selector 708, of the plurality of selectors 704, is illustrated. Because selector 708 is selected, display of selector 708 is modified (e.g., enlarged, animated, including a colored border/shadow according to selector 708). Based on selection of selector 708, the theme of the game will be updated according to the selected theme (e.g., Team 7), as described herein.

Although list 702 is illustrated as being displayed all at once, in some embodiments a greater number of theme options may be provided. Accordingly, selectors 704 may be divided into different pages with previous ("PREV"), exit ("EXIT"), and next ("NEXT") selectors provided such that a player can navigate to a previous page of selectors 704, exit list 702 (e.g., such that list 702 is no longer overlaid upon interface 600), or navigate to a next page of selectors 704 respectively.

Figure 7B:
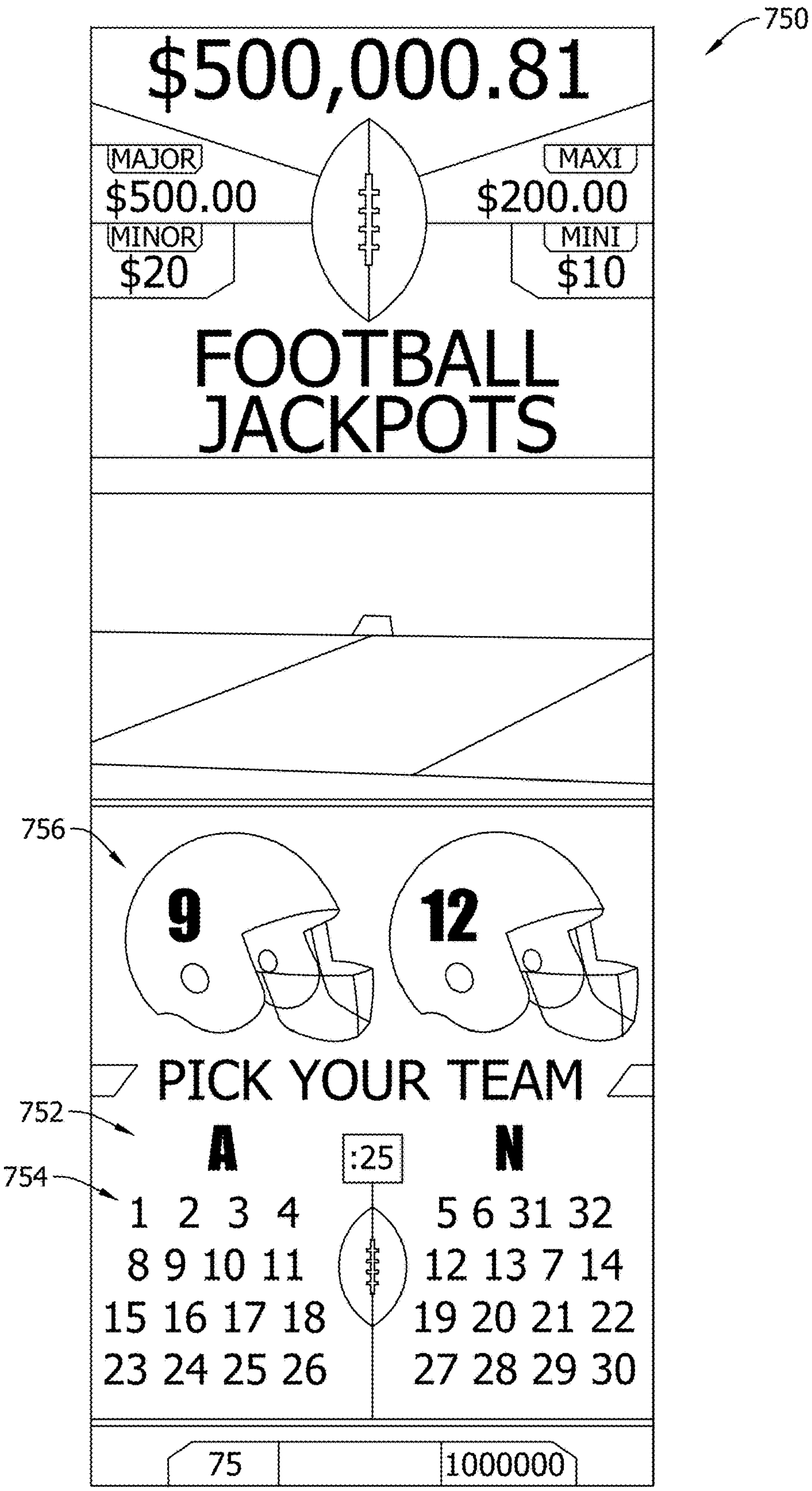
FIG. 7B illustrates another example selection screenshot and/or interface for dynamic theme selection in electronic gaming, continuing the example shown in FIG. 6.

FIG. 7B illustrates another example selection screenshot and/or interface 750 for dynamic theme selection in electronic gaming, continuing the example shown in FIG. 6. For instance, similar to FIG. 7A, interface 750 includes a list 752 of available themes including a plurality of selectors 754. Further, a scrollable list 756, corresponding to plurality of selectors 754, is provided. For example, using a touchscreen of interface 750, a player could "swipe" through list 756 to select a selector in list 756 and/or select from plurality of selectors 754 shown in list 752. To select the same theme shown as selected in FIG. 7A, a player may select a selector "7" associated with Team 7.

As shown in FIG. 7B, plurality of selectors 754 are divided by a sub-theme (e.g., here, football conference such as Conference "A" or Conference "N"). Notably, selectors 754 corresponding to any theme may be displayed and/or sub-divided in any was deemed fit (e.g., by a game provider).

Figure 7C:
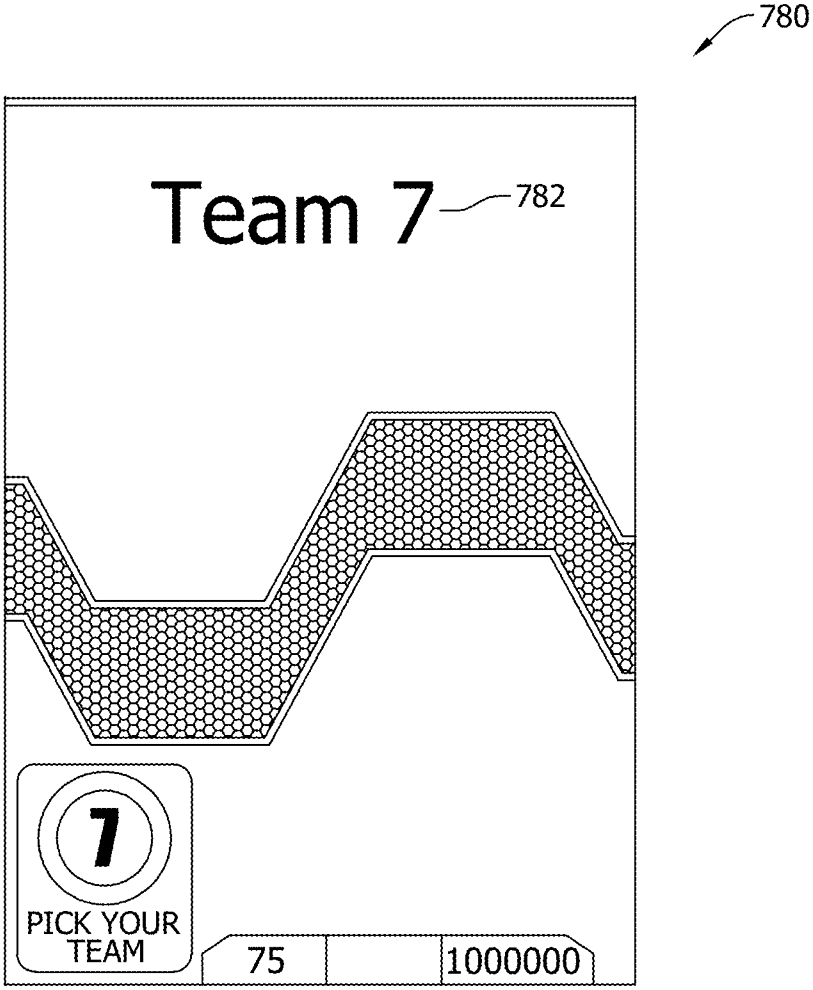
FIG. 7C illustrates an example transition screenshot and/or interface, continuing the examples shown in FIGS. 7A and/or 7B.

FIG. 7C illustrates an example transition screenshot and/or interface 780, continuing the examples shown in FIGS. 7A and/or 7B. For example, upon selection of selector 708 (as shown in FIG. 7A) or a selector in FIG. 7B, a transition animation may be displayed including an indication 782 of the selected theme (e.g., as shown in FIG. 7C, a team logo for Team 7).

Figure 8A:
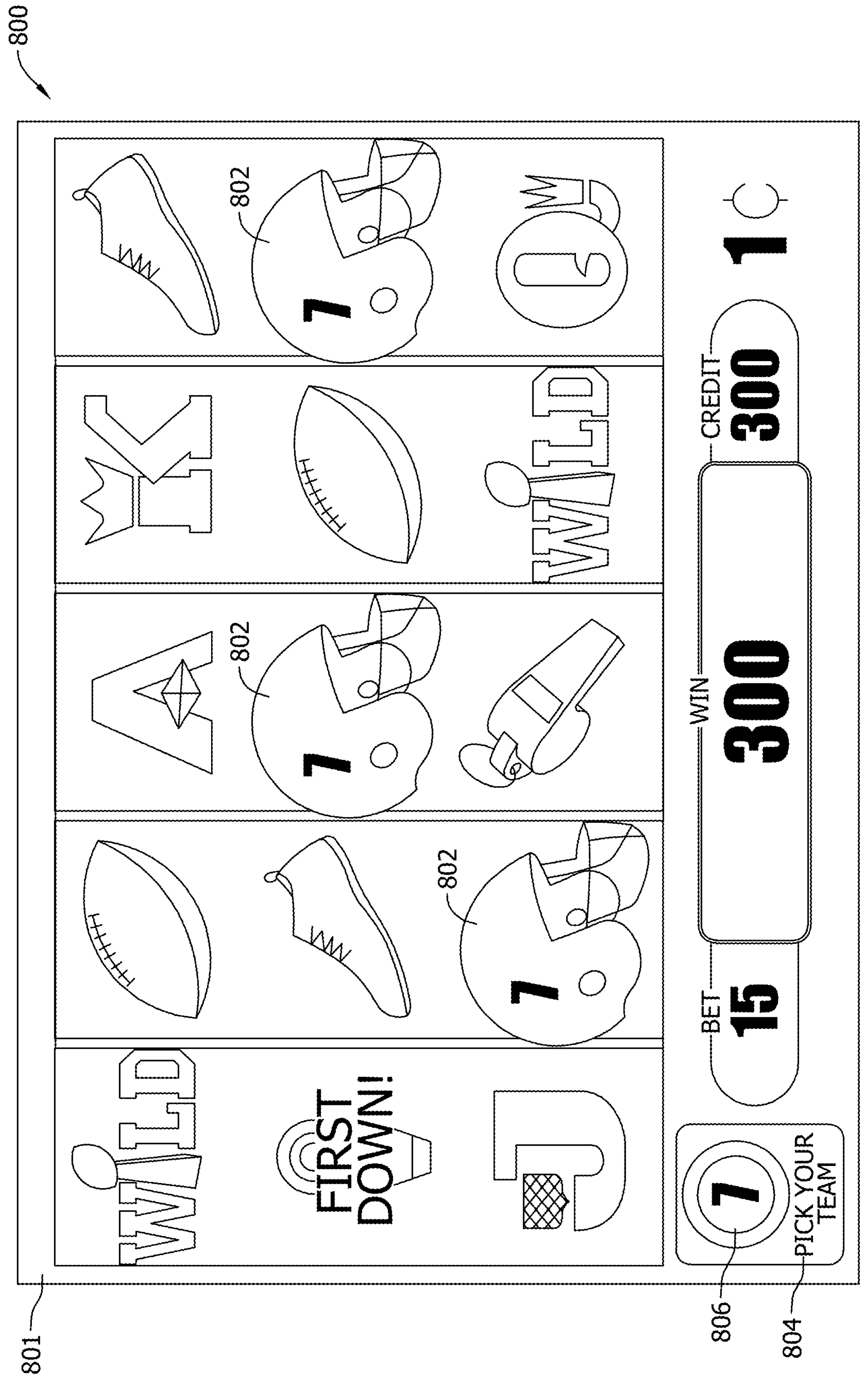
FIG. 8A illustrates an example screenshot and/or interface showing an output after for dynamic theme selection in electronic gaming, based on a selection made in FIG. 7A.

FIG. 8A illustrates an example interface 800 or screenshot showing an output after for dynamic theme selection in electronic gaming, based on the selection of selector 708 as shown in FIG. 7A or a selector in FIG. 7B. Interface 800 includes a theme background 801 (e.g., matching background 601, as the theme still corresponds to football), a plurality of theme symbols 802 corresponding to the selection of selector 708 (e.g., and replacing symbols 602, as shown in FIG. 6), and a theme selector 804 (e.g., as shown in FIG. 6) including a theme indicator 806 (e.g., as updated from indicator 606 shown in FIG. 6).

For example, with respect to FIGS. 4, 7A, and 8A, list 702 including a plurality of themes is displayed as controlled by theme selection component 406. Upon receiving selection of selector 708, theme manager component 410 requests host component 404 reload a game with the selected theme (e.g., theme manager component 410 transmits a request 422 including a theme ID associated with selector 708 to client context component 416).

Based on request 422, client context component 416 communicates with game manager component 418 to coordinate a game reset (e.g., from the default theme, Team 5, to the selected theme, Team 7). Fast game reset component 420 recreates the game according to selection of selector 708 and transmits a message 424 to game client component 412 including the recreated game.

Based on receipt of the recreated game, game initialization component 414 initializes the recreated game on the gaming device (e.g., causes display of interface 800) and game client component 412 executes the game with the selected theme. The electronic game is displayed with the selected theme including theme symbols 802. A game outcome, including at least one symbol of theme symbols 802 (e.g., or other theme symbols associated with the theme), for the electronic game is generated, displayed, and stored in a game log as being associated with the identifier. Thus, upon replay and/or recovery of the game outcome, the replay and/or recovery includes the game outcome including the at least one symbol based on the identifier.

Figure 8B:
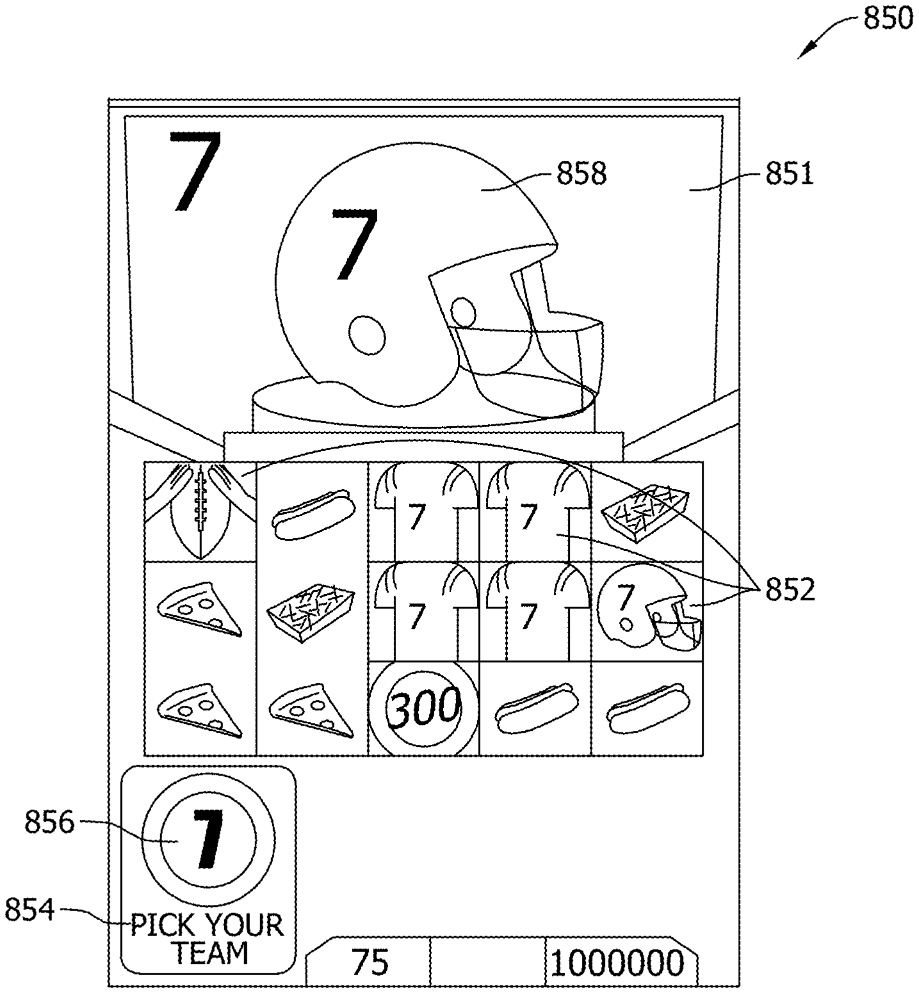
FIG. 8B illustrates another example screenshot and/or interface showing an output after for dynamic theme selection in electronic gaming, based on a selection made in FIG. 7B.

FIG. 8B illustrates another example screenshot and/or interface 850 showing an output after for dynamic theme selection in electronic gaming, based on a selection made in FIG. 7B. For instance, similar to FIG. 8A, interface 850 includes a theme background 851, a plurality of theme symbols 852 corresponding to the selection of a selector of list 756 (e.g., Team 7), and a theme selector 854 including a theme indicator 856. An additional theme indicator 858 corresponding to the selected theme is also shown in FIG. 8B.

Figure 9:
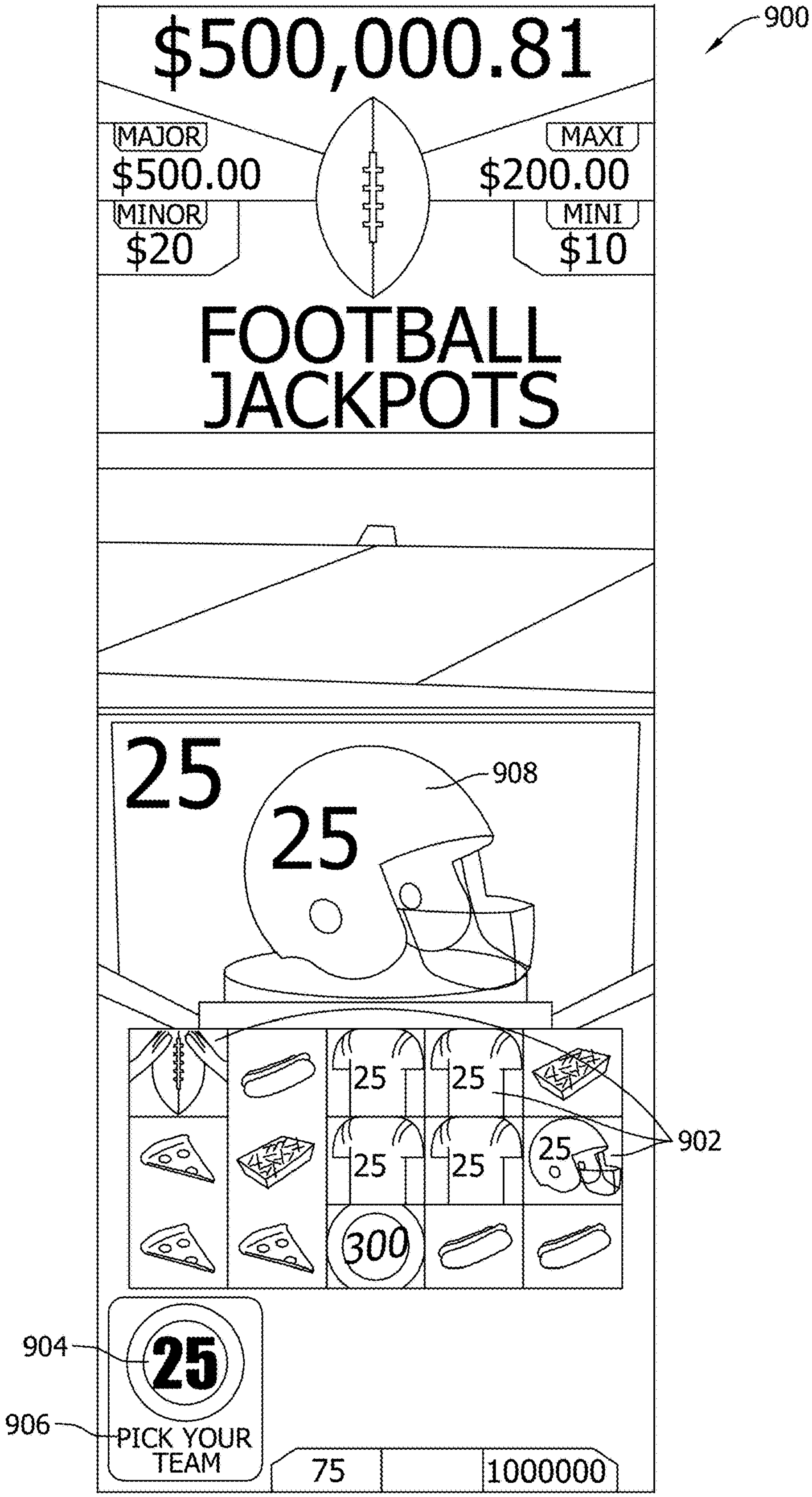
FIG. 9 illustrates an example screenshot and/or interface illustrating a first theme for dynamic theme selection in electronic gaming, in accordance with the present disclosure.

FIG. 9 illustrates an example screenshot and/or interface 900 illustrating a first theme for dynamic theme selection in electronic gaming, in accordance with the present disclosure. In the example shown in FIG. 9, a player-selected theme (e.g., Team 25) is shown. For example, symbols 902 are tailored to the player-selected them as well as other aspects of the game (e.g., sounds). A theme selector 904 is displayed including a theme indicator 906 corresponding to the player-selected theme. An additional theme indicator 908 is also displayed as corresponding to the player-selected theme.

Figure 10:
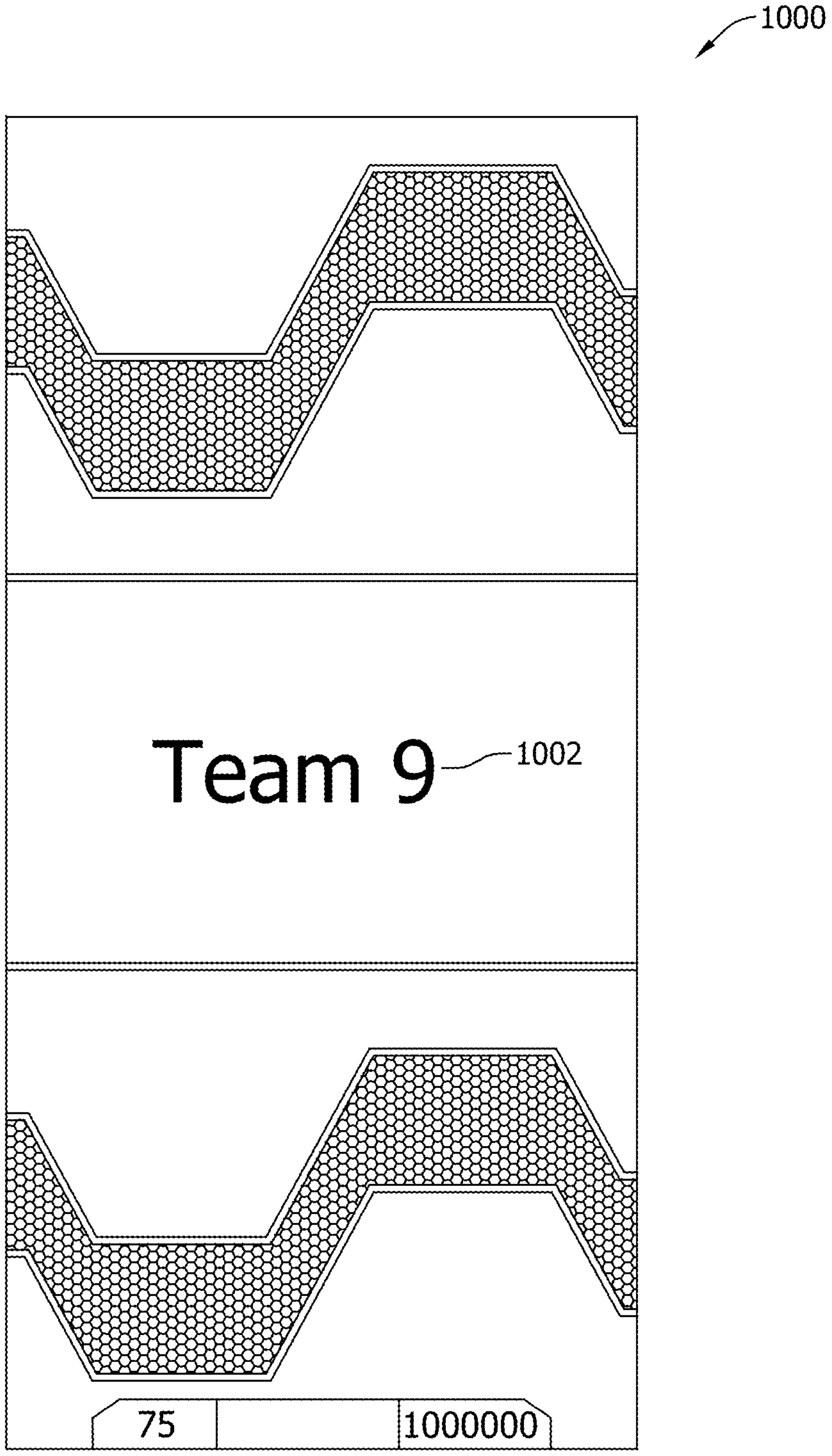
FIG. 10 illustrates an example screenshot and/or interface illustrating a transition to an operator-selected theme, continuing the example shown in FIG. 9.

FIG. 10 illustrates an example screenshot and/or interface 1000 illustrating a transition to an operator-selected theme, continuing the example shown in FIG. 9. For example, as explained herein, after a predetermined amount of inactivity at an electronic gaming device, the electronic gaming device may revert to one or more default themes (e.g., selected by an operator). In some embodiments, themes of games may automatically be changed for reasons other than inactivity, as explained elsewhere herein (e.g., occurrence of a real-time event, a schedule, etc.). As shown in FIG. 10, a transition animation including a new theme indicator 1002 (e.g., corresponding to Team 9) is displayed because of one or more default themes being Team 9. As explained elsewhere herein, default themes may rotate if more than one default theme is selected. Accordingly, the animation shown in FIG. 10 may be displayed with each such transition between themes (e.g., including a respective theme indicator).

Figure 11:
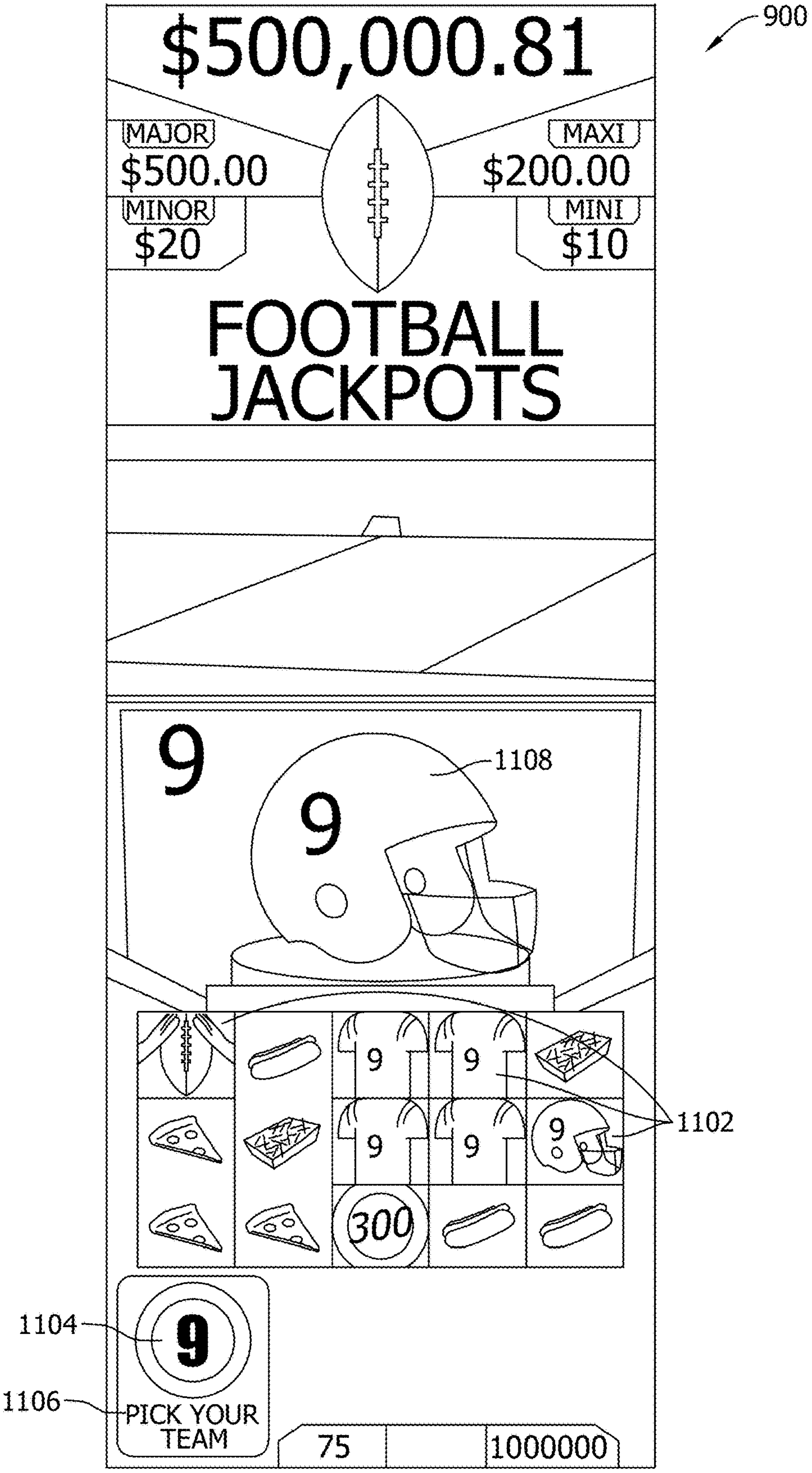
FIG. 11 illustrates an example screenshot and/or interface illustrating an operator-selected theme, continuing the example shown in FIG. 10.

FIG. 11 illustrates an example screenshot and/or interface 1100 illustrating an operator-selected theme, continuing the example shown in FIG. 10. For example, as shown in FIG. 11, the game of FIG. 9 is now displayed with the default theme (e.g., shown in FIG. 10) instead of the player-selected theme. Here, as illustrated in FIG. 10, a default theme corresponds to Team 9. Accordingly, symbols 1102 have changed to correspond to the theme of Team 9 (e.g., rather than the theme of Team 25, as shown in FIG. 9), while remaining in the symbol positions shown in FIG. 9 (e.g., because a next play of the game has not yet occurred). A theme selector 1104 is displayed including a theme indicator 1106 corresponding to the player-selected theme. An additional theme indicator 1108 is also displayed as corresponding to the player-selected theme.

Figure 12:
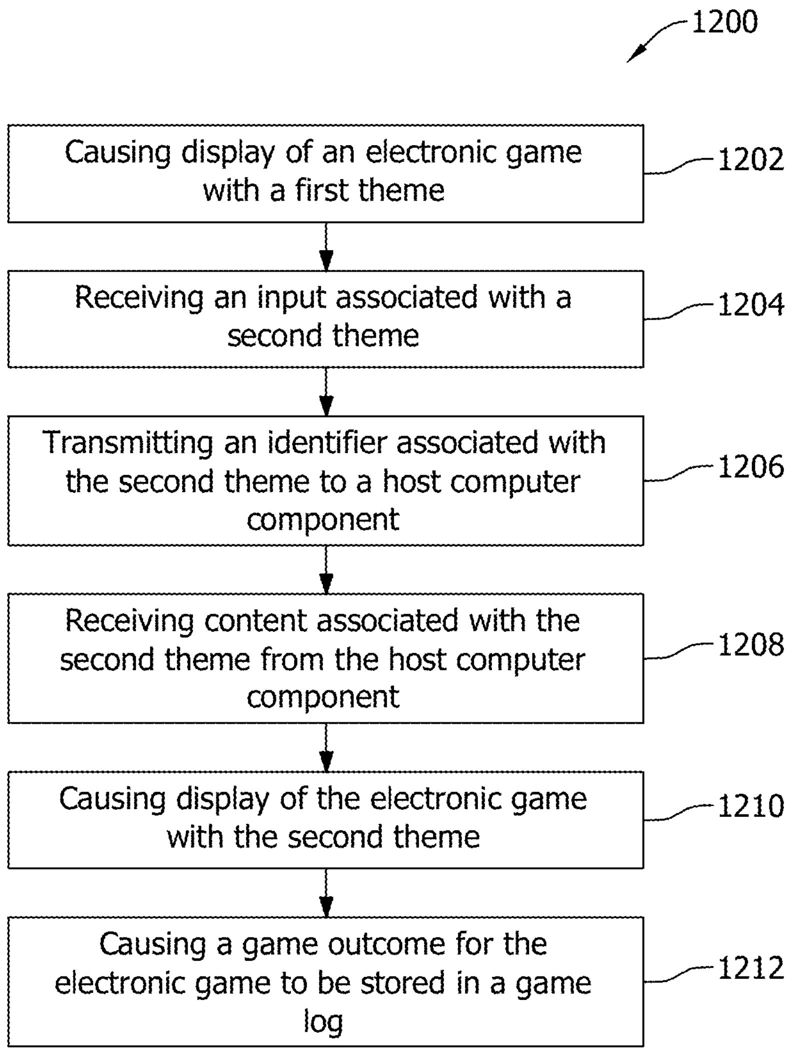
FIG. 12 illustrates an example method for dynamic theme selection in electronic gaming, in accordance with the present disclosure.

FIG. 12 illustrates an example method 1200 for dynamic theme selection in electronic gaming, in accordance with the present disclosure. In the example embodiment, method 1200 includes causing display 1202 of an electronic game with a first theme (e.g., Team 5), the first theme including a first plurality of symbols (e.g., 602), receiving 1204 an input associated with a second theme (e.g., Team 7), and transmitting 1206 an identifier associated with the second theme to a host computer component (e.g., in some embodiments, the host component is a component of a processor and in some embodiments, the host is code executed by a processor). Method 1200 also includes receiving 1208 content (e.g., including symbols, an animation, a video, a background animation, a voice over, a reel background, and/or a help screen) associated with the second theme from the host computer component wherein the content includes a second plurality of symbols (e.g., 802) and causing display 1210 of the electronic game with the second theme, the second theme including the second plurality of symbols. Method 1200 further includes causing 1212 a game outcome for the electronic game to be stored in a game log in at least one memory as being associated with the identifier wherein the game outcome includes at least one symbol of the second plurality of symbols, and wherein upon generation of a replay of the game outcome, the replay includes the at least one symbol based on the identifier and the game outcome and causing display 1214 of the game outcome.

In some embodiments, method 1200 includes causing display of a menu including a plurality of selectable icons associated with a plurality of themes, the plurality of themes including the first theme and the second theme and receiving the input associated with the second theme at the menu.

In some embodiments, method 1200 includes identifying a default theme stored in memory and causing display of the electronic game with the first theme, wherein the first theme includes the default theme. As an example, in some embodiments the default theme may include a plurality of themes. In some embodiments, method 1200 includes determining that the default theme stored in memory has changed to an updated default theme (e.g., based on a schedule, an operator input, etc.) and causing display of the electronic game with the updated default theme.

In some embodiments, method 1200 includes determining that a game session of the electronic game with the second theme has ended and based on the game session ending, causing display of the electronic game with the first theme.

In some embodiments, method 1200 includes receiving the input associated with the second theme from an end user device associated with a player wherein the input identifies the second theme as being selected by the player and stored in a player account associated with the player.

Figure 13:
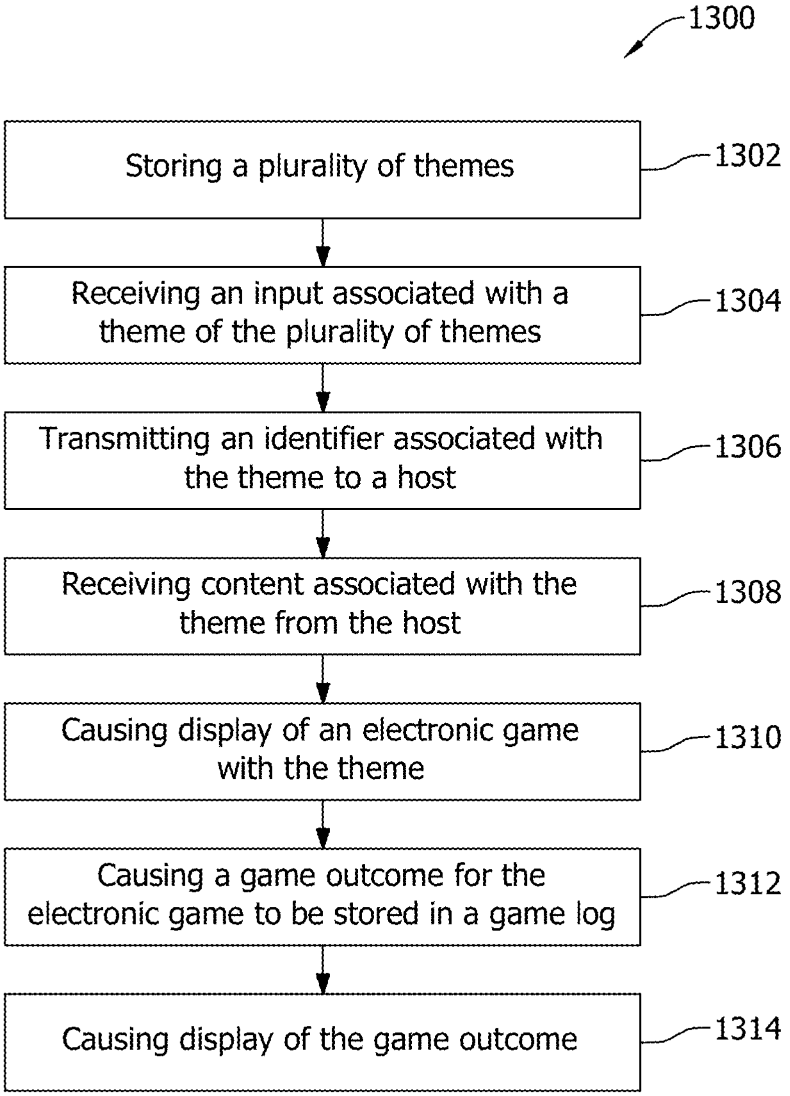
FIG. 13 illustrates another example method for dynamic theme selection in electronic gaming, in accordance with the present disclosure.

FIG. 13 illustrates another example method 1300 for dynamic theme selection in electronic gaming, in accordance with the present disclosure. In the example embodiment, method 1300 includes storing 1302 a plurality of themes in memory, receiving 1304 an input associated with a theme of the plurality of themes, and transmitting 1306 an identifier associated with the theme to a host component of the at least one processor. Further, method 1300 includes receiving 1308 content associated with the theme from the host component wherein the content includes a plurality of symbols (e.g., and/or an animation, a video, a background animation, a voice over, a reel background, and/or a help screen) and causing display 1310 of an electronic game with the theme, the theme including the plurality of symbols. Method 1300 also includes causing 1312 a game outcome for the electronic game to be stored in a game log in memory as being associated with the identifier wherein the game outcome includes at least one symbol of the plurality of symbols, and wherein upon generation of a replay of the game outcome, the replay includes the at least one symbol based on the identifier and the game outcome and causing display 1314 of the game outcome.

In some embodiments, method 1300 includes causing display of a menu including a plurality of selectable icons associated with a plurality of themes, the plurality of themes including the theme and receiving the input associated with the theme at the menu. In some embodiments, method 1300 includes determining that a game session of the electronic game with the theme has ended and, based on the game session ending, causing display of the electronic game with a default theme.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system comprising:

at least one memory with instructions stored thereon; and at least one processor in communication with the at least one memory, wherein the instructions, when executed by the at least one processor, cause the at least one processor to:

cause display of an electronic game with a first theme, the first theme comprising a first plurality of symbols to replace placeholder symbols during play of the electronic game;

receive an input associated with a second theme;

transmit an identifier associated with the second theme to a host component of the at least one processor;

receive content associated with the second theme from the host component, wherein the content comprises a second plurality of symbols to replace the placeholder symbols during play of the electronic game;

cause a game outcome to be provided for the electronic game, the game outcome including at least one of the second plurality of symbols replacing at least one placeholder symbol of the placeholder symbols;

cause the game outcome for the electronic game to be stored in a game log in the at least one memory as incluidng the at least one placeholder symbol and being associated with the identifier; and based upon receiving a request to one of replay or restore the electronic game, cause display of the game outcome as including the at least one of the second plurality of symbols replacing the at least one placeholder symbol based upon the game outcome being stored in the game log as including the at least one placeholder symbol and being associated with the identifier.

2. The electronic gaming system of claim 1, wherein the instructions further cause the at least one processor to:

cause display of a menu including a plurality of selectable icons associated with a plurality of themes, the plurality of themes including the first theme and the second theme; and receive the input associated with the second theme at the menu.

3. The electronic gaming system of claim 1, wherein the instructions further cause the at least one processor to:

identify a default theme stored in the at least one memory; and cause display of the electronic game with the first theme, wherein the first theme comprises the default theme.

4. The electronic gaming system of claim 3, wherein the default theme comprises a plurality of themes.

5. The electronic gaming system of claim 3, wherein the instructions further cause the at least one processor to:

determine that the default theme stored in the at least one memory has changed to an updated default theme; and cause display of the electronic game with the updated default theme.

6. The electronic gaming system of claim 1, wherein the instructions further cause the at least one processor to:

determine that a game session of the electronic game with the second theme has ended; and based on the game session ending, cause display of the electronic game with the first theme.

7. The electronic gaming system of claim 1, wherein the instructions further cause the at least one processor to receive the input associated with the second theme from an end user device associated with a player, wherein the input identifies the second theme as being selected by the player and stored in a player account associated with the player.

8. The electronic gaming system of claim 1, wherein the content further comprises at least one of an animation, a video, a background animation, a voice over, a reel background, or a help screen.

9. At least one non-transitory, computer-readable storage medium with instructions stored thereon that, in response to execution by at least one processor, cause the at least one processor to:

cause display of an electronic game with a first theme, the first theme comprising a first plurality of symbols to replace placeholder symbols during play of the electronic game;

receive an input associated with a second theme;

transmit an identifier associated with the second theme to a host component of the at least one processor;

receive content associated with the second theme from the host component, wherein the content comprises a second plurality of symbols to replace the placeholder symbols during play of the electronic game;

cause a game outcome to be provided for the electronic game, the game outcome including at least one of the second plurality of symbols replacing at least one placeholder symbol of the placeholder symbols;

cause the game outcome for the electronic game to be stored in a game log in at least one memory as including the at least one placeholder symbol and being associated with the identifier; and based upon receiving a request to one of replay or restore the electronic game, cause display of the game outcome as including the at least one of the second plurality of symbols replacing the at least one placeholder symbol based upon the game outcome being stored in the game log as including the at least one placeholder symbol and being associated with the identifier.

10. The at least one non-transitory computer-readable storage medium of claim 9, wherein the instructions further cause the at least one processor to:

cause display of a menu including a plurality of selectable icons associated with a plurality of themes, the plurality of themes including the first theme and the second theme; and receive the input associated with the second theme at the menu.

11. The at least one non-transitory computer-readable storage medium of claim 9, wherein the instructions further cause the at least one processor to:

identify a default theme stored in the at least one memory; and cause display of the electronic game with the first theme, wherein the first theme comprises the default theme.

12. The at least one non-transitory computer-readable storage medium of claim 11, wherein the default theme comprises a plurality of themes.

13. The at least one non-transitory computer-readable storage medium of claim 11, wherein the instructions further cause the at least one processor to:

determine that the default theme stored in the at least one memory has changed to an updated default theme; and cause display of the electronic game with the updated default theme.

14. The at least one non-transitory computer-readable storage medium of claim 9, wherein the instructions further cause the at least one processor to:

determine that a game session of the electronic game with the second theme has ended; and based on the game session ending, cause display of the electronic game with the first theme.

15. The at least one non-transitory computer-readable storage medium of claim 9, wherein the instructions further cause the at least one processor to receive the input associated with the second theme from an end user device associated with a player, wherein the input identifies the second theme as being selected by the player and stored in a player account associated with the player.

16. The at least one non-transitory computer-readable storage medium of claim 9, wherein the content further comprises at least one of an animation, a video, a background animation, a voice over, a reel background, or a help screen.

17. An electronic gaming system comprising:

at least one memory with instructions stored thereon; and at least one processor in communication with the at least one memory, wherein the instructions, when executed by the at least one processor, cause the at least one processor to:

store a plurality of themes in the at least one memory;

receive an input associated with a theme of the plurality of themes;

transmit an identifier associated with the theme to a host component of the at least one processor;

receive content associated with the theme from the host component, wherein the content comprises a plurality of symbols to replace placeholder symbols during play of an electronic game;

cause a game outcome to be provided for the electronic game with the theme, the game outcome including at least one of the plurality of symbols replacing at least one placeholder symbol of the placeholder symbols;

cause the game outcome for the electronic game to be stored in a game log in the at least one memory as including the at least one placeholder symbol and being associated with the identifier; and based upon receiving a request to one of replay or restore the electronic game, cause display of the game outcome as including the at least one of the plurality of symbols replacing the at least one placeholder symbol based upon the game outcome being stored in the game log as incluidng the at least one placeholder symbol and being associated with the identifier.

18. The electronic gaming system of claim 17, wherein the instructions further cause the at least one processor to:

cause display of a menu including a plurality of selectable icons associated with the plurality of themes, the plurality of themes including the theme; and receive the input associated with the theme at the menu.

19. The electronic gaming system of claim 17, wherein the instructions further cause the at least one processor to:

determine that a game session of the electronic game with the theme has ended; and based on the game session ending, cause display of the electronic game with a default theme.

20. The electronic gaming system of claim 17, wherein the content further comprises at least one of an animation, a video, a background animation, a voice over, a reel background, or a help screen.

* * * * *